W. C. DOSS.
Cultivator.

No. 23,906.  Patented May 10, 1859.

Witnesses:  Inventor:

UNITED STATES PATENT OFFICE.

WILLIAM C. DOSS, OF LAVACA, TEXAS.

IMPROVEMENT IN CULTIVATORS.

Specification forming part of Letters Patent No. 23,906, dated May 10, 1859.

*To all whom it may concern:*

Be it known that I, WM. C. DOSS, of Lavaca, in the county of Calhoun and State of Texas, have invented a new and Improved mode of Cultivating Cotton, Corn, &c.; and I do hereby declare that the following is a full and exact description thereof, reference being had to the accompanying drawings, and to the letters of reference marked thereon.

The nature of my invention consists of a triangular frame with five shares or plows and a scraper. Three of said shares have mold-boards attached by means of screws, and should be used for hilling plants and keeping the ridge up as desired. The scraper is used for scraping cotton, &c.

To enable others skilled in the art to make and use my invention, I will proceed to describe its construction and operation.

Figure 1:
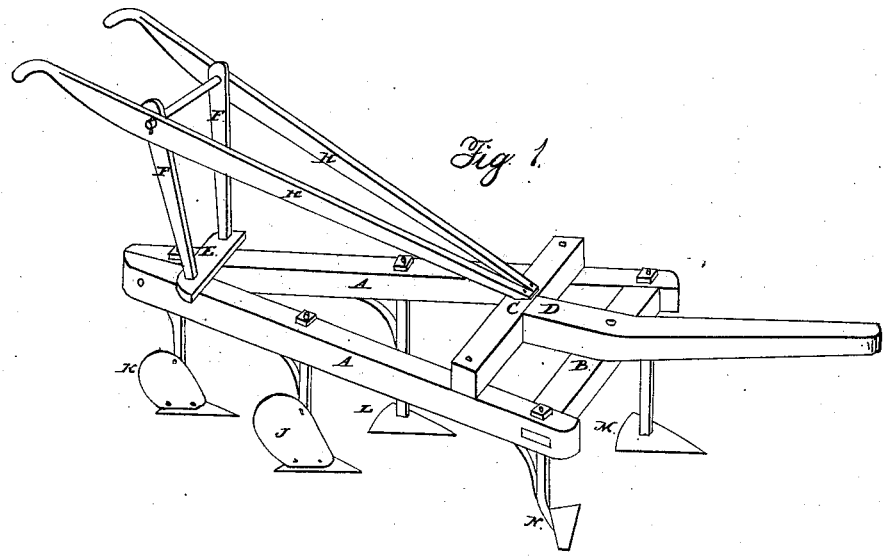
Figure 2:
Figure 2:
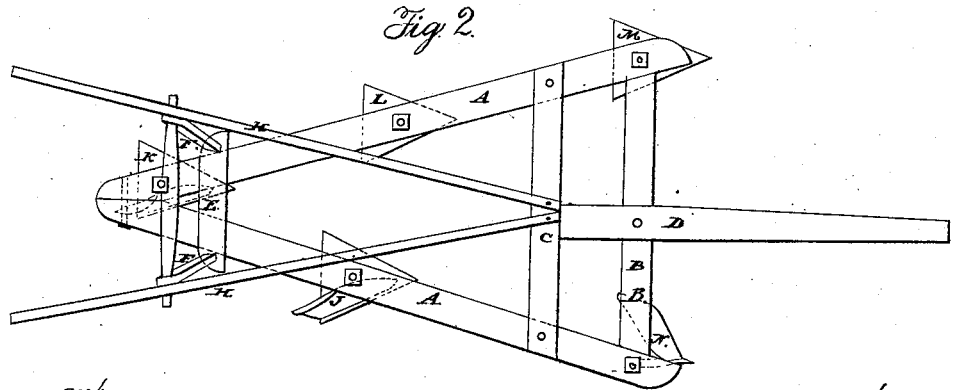

I make a triangular frame. Figure 1 is a perspective view, and Fig. 2 is a top view. The side pieces (marked A A) are three and one-half feet long by two and one-half inches square. The front piece (marked B) is two feet long by two and one-half inches square. These three pieces are framed together by tenoning B into A A in front and mitering A A together at the hind end, and secure them together by means of a bolt. I have a beam (marked D) three and one-half feet long, two and one-half inches square at the hind end and two inches square in front. I have also a piece (marked C) that rests on top of the frame A A, eight or nine inches in rear of the front, two and one-half inches square, and made secure by bolts passing through frame A A and each end of C. I make a mortise in C one and one-half inch to the right of the center for a tenon on the end of beam, and let it (the beam) rest on top of front piece, B, one and one-half inch from the center on the right, to have the beam in the center of resistance. The beam is secured to B by a bolt. I have five shares or plows for this frame, all of them a triangular shape, and one scraper. Shares marked I, J, and K have mold-boards and vary in size. Share marked I is seven inches across the hind part and eight inches long. Share marked J is six inches wide and seven inches long, and shares marked K, L, and M are five inches wide and six inches long, all the shares made of iron three-eighths inch thick and cupped a little to prevent the soil or clay from sticking to the bottom. The shanks of these shares are all the same size and length. I take iron one inch square, twelve inches long, and reduce three inches of one end to three-fourths inch tapering, and cut a screw one inch down and fit a nut. This three inches passes through the frame and is made fast by screwing on the nut. The other end passes in and a little through the share one-third distant from heel to point nearest the heel in the center from either side, and is riveted securely. I have a brace on each shank three-eighths inch thick by three-fourths inch wide, ten inches long. Weld one end on the shank four and one-half inches above the share, and secure the other end to the frame about four and one-half inches in rear of the shank by means of a screw.

The scraper (marked N) is made of a piece of iron nine inches long, three-eighths inch thick, and six inches wide. This piece is riveted to a shank made as those above described, except the lower end is drawn to a wedge-shape point. Said scraper, when riveted on, should be eight and one-half inches long on the left side of the shank and set at an angle, that it will not scrape more than six inches. There is a cutter in front of scraper, formed by turning the right-hand end of scraper to range parallel with the beam. The cutter is made sharp and cuts close to the cotton without injury to the plant. The bottom edge of scraper is made sharp and drawn out forward, so it will readily take hold.

The mold-board on share marked I is eight and one-half inches long, seven inches wide, the lower edge made sharp and fitted close on the top of the share. Five inches of the front is of a diamond shape, the front end being secured to share three inches in rear of the point, in the center in front of shank, by a screw passing through the mold-board into the share. Another screw is used in like manner near the right corner of the share, and another screw passes through the mold-board, near the top edge, into the shank. Share marked J has a mold-board seven inches long, six inches wide, formed and secured with screws, as share marked I, and share marked K has a mold-board six inches long and five inches wide, of like shape, secured by two screws, one near the point and one near the right corner of the share. These mold-boards are used for hilling the plants and keeping the ridge up, as may be desired. When you wish to use the scraper, share marked I is taken out and scraper put in its place, and the mold-boards on shares marked J and K may remain on, if it is desired to keep the ridge fully up, if not, take them off, and you will not only scrape your cotton well, but at the same time clean the middle of the rows of all the grass and weeds.

When done with using scraper, take it out of frame and put share marked I in its place. If the mold-boards are off of shares marked J and K, put them on and you can hill the plants and cultivate the whole row by running twice in rows of ordinary width.

If it is not desired to hill the plants or keep up the ridge, take off the mold-boards, and you can kill more grass and weeds in the same time than you can with two plows and leave the land in much better order.

The shares or plows are arranged and set in the frame in the following manner: I put the shanks of share marked M through the frame in the center of A and B, the left-hand corner in front; and four and one-half inches from the center of share M, measuring on B, running back parallel with the beam in A, I put share marked L; and four and one-half inches from this, measuring along B, I put share marked K in frame A, near the end of A. Behind and four and three-fourths inches from this, along on B, I put share marked J in frame A; and five inches from this I work share marked I and scraper marked N near the right-hand corner in front of frame. All the shares should range parallel to the beam. When the shares are thus arranged neither grass nor weeds can escape, as the shares lap over in cutting about one inch.

What I claim, and desire to secure by Letters Patent, is—

The described arrangement on the triangular frame A A B of shares J K, with mold-boards that may be taken off at pleasure, scraper N, and cultivators L M, the whole being constructed for operation in the manner and for the purpose specified.

WM. C. DOSS.

Witnesses:
   J. B. THOMPSON,
   S. J. LEE.